June 18, 1974 K. J. YOST 3,817,858
AEROBIC SEWAGE TREATMENT SYSTEM
Filed April 5, 1972 2 Sheets-Sheet 1
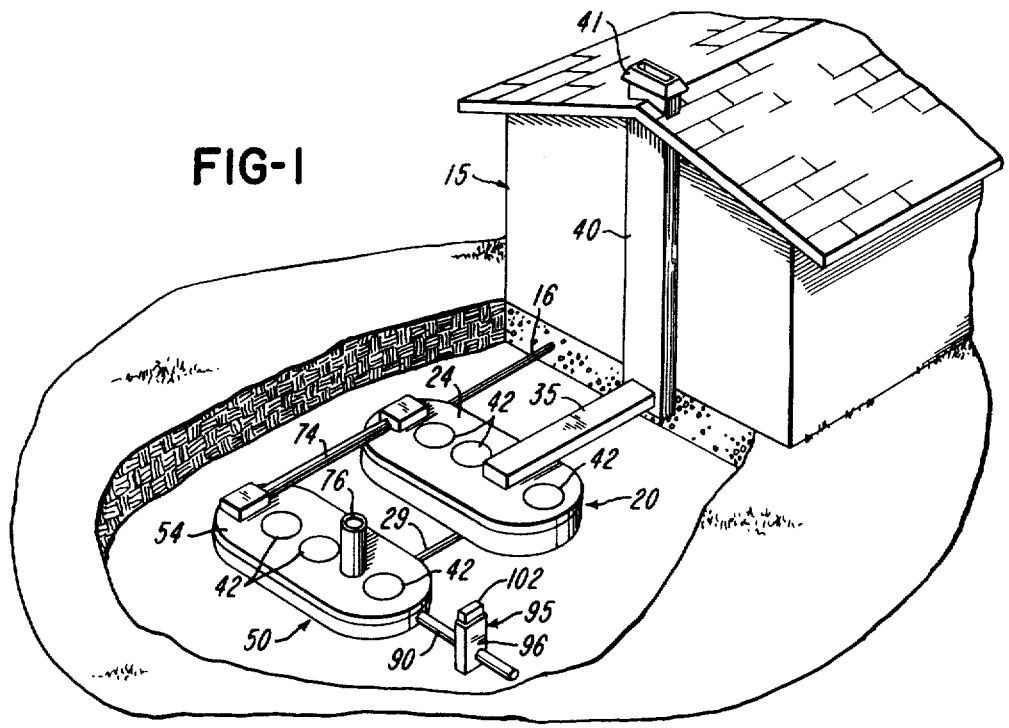
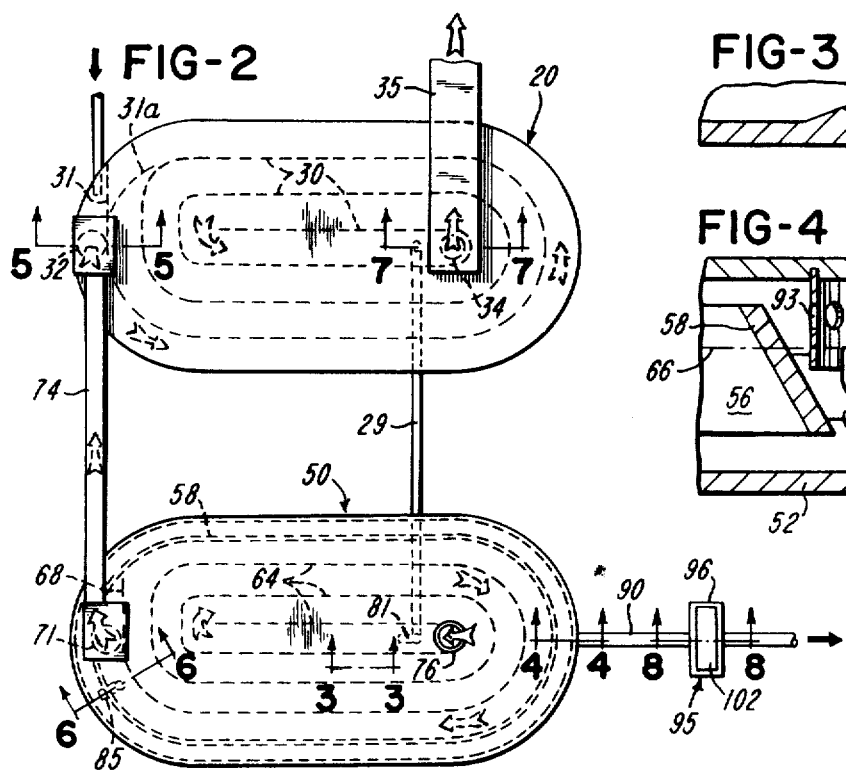
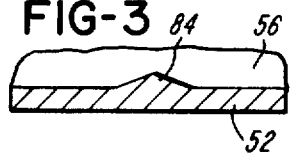
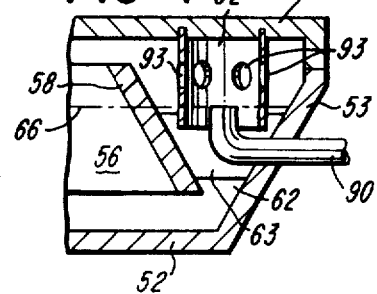

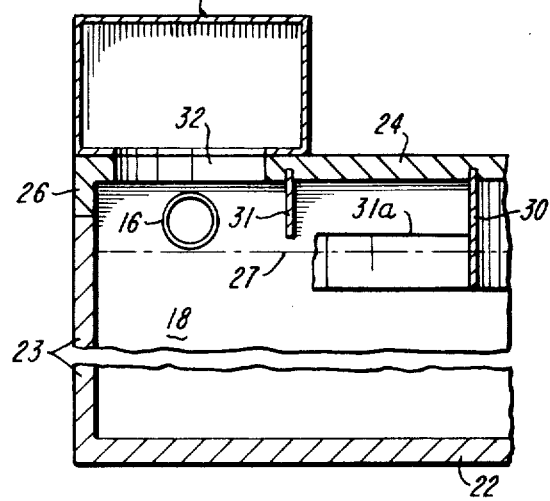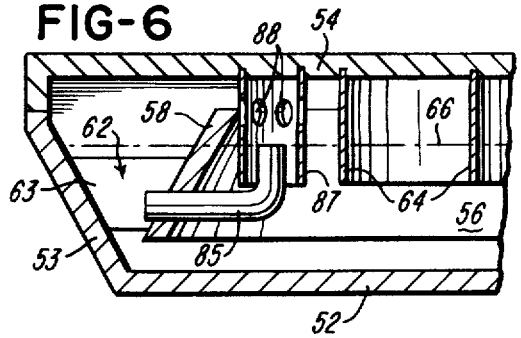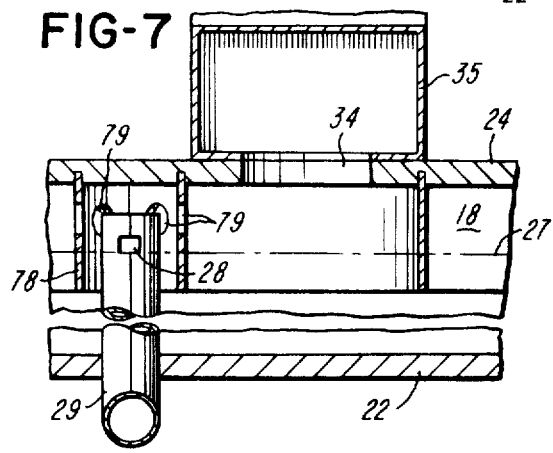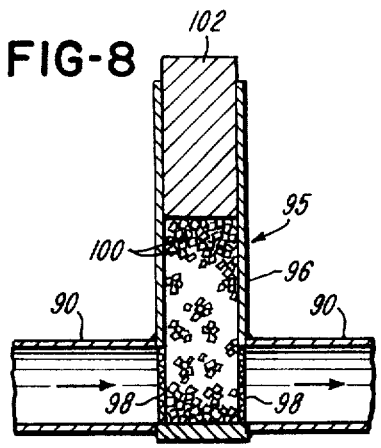

United States Patent Office 3,817,858
Patented June 18, 1974

3,817,858
AEROBIC SEWAGE TREATMENT SYSTEM
Kenneth J. Yost, Eaton, Ohio, assignor to Coate Burial Vault Inc., West Milton, Ohio
Filed Apr. 5, 1972, Ser. No. 241,128
Int. Cl. C02b *3/08;* C02c *5/10*
U.S. Cl. 210—14
14 Claims

ABSTRACT OF THE DISCLOSURE

Liquid sewage from an individual residence is directed generally tangentially into a large, flat and shallow aerobic settlement tank to expose a large surface area of the sewage per unit volume. Air is circulated over the surface of the sewage in a generally spiral direction to effect circulation or turbulence of the sewage within the tank and diffusion of the air into the liquid. The air flow within the tank is produced by connecting the air outlet of the tank to a chimney which projects upwardly adjacent the outer wall of the residence and creates a natural draft. The liquid treated in the aerobic settlement tank is directed into a similarly shaped aerobic digestor and clarifier tank which also provides for circulation of the treated liquid and diffusion of the air in response to a generally spiral flow of air also created by the chimney draft. The second tank defines an annular clarifier chamber which receives the treated liquid before it is discharged. The discharged effluent may be directed through a chlorinator formed by a vertical housing which receives a supply of chlorine crystals. The crystals are urged downwardly into the path of the effluent by a combined weight and valve member which is effective to stop the flow of treated liquid in the event additional chlorine crystals are not added to the supply.

BACKGROUND OF THE INVENTION

When a public or central sewage treatment plant is not available for treating the raw sewage from a single family residence or other small apartment, commercial building or the like, it is common to use a septic tank where anaerobic bacteria action will digest usually only approximately 50% of the solids contained within the sewage. The effluent discharge from the septic tank is directed through a leaching bed, but frequently, the soil in which the leaching bed is embedded, does not have proper leaching characteristics. For example, when the soil is highly porous and contains a large percentage of sand and/or gravel, the effluent from the septic tank flows through the soil quickly and sometimes contaminates an underground water stream or adjacent lake, river, etc. On the other hand, if the soil has a high clay content and thus relatively low porosity, the effluent from the septic tank frequently percolates up onto the ground surface and creates an undesirable odor and sometimes pollutes surface water which flows into streams. In addition, the septic tank requires periodic cleaning to remove the collected solids, and occasionally the leaching bed fills up and must be reconstructed or moved.

A number of sewage treatment tanks and systems have been constructed or proposed for treating sewage by using aerobic digestion of the solid particles within the sewage. That is, air is introduced into the liquid sewage so that between 90% and 95% of the solid particles within the sewage are digested. Such aerobic digestors are generally accepted for commercial or industrial sewage treatment where regular maintenance personnel are available. However, the aerobic digestors or systems which have been used for single family or individual residence, usually present several problems. These problems primarily result from the lack of maintenance which the systems receive.

For example, U.S. Pats. No. 2,852,140, No. 2,889,047 and No. 2,987,186 each disclose a home-type aerobic digestor unit incorporating a motor driven pump, and U.S. Pat. No. 3,627,135 discloses the use of a motor driven air compressor for an aerobic sewage treatment tank. Since the units are usually recessed within the ground, the private home owner tends to forget about the operation of the unit and sometimes deliberately switches off the electrical power supply for the motor driven pump or air compressor when the unit is in need of repair. An aerobic digester makes a very poor anaerobic digester or septic tank, and when the motor driven pump or compressor is stopped, raw sewage enters the effluent discharge line where it can quickly pollute an underground or surface water stream. In view of the likelihood of an aerobic sewage treatment unit being operated improperly after it is installed for use with an individual residence and the serious problems which result when the unit does not operate properly, many state and local health departments prohibit the installation of such units for use in treating the sewage from an individual residence.

SUMMARY OF THE INVENTION

The present invention is directed to an improved aerobic sewage treatment method and apparatus which is ideally suited for use in conjunction with a single family or individual residence, but which may also be used for treating the sewage from other buildings such as small apartments, commercial and light industrial buildings, etc. The aerobic sewage treatment system of the invention provides the desirable advantage of minimizing the maintenance required for assuring that the system continues to operate properly, and in the preferred embodiment, completely eliminates the need for any moving mechanism such as a motor driven pump or compressor and the costs of the mechanism. As a result, the system of the invention provides for substantially eliminating the down time commonly required for maintaining conventional aerobic digestors, and also eliminates the possibility of raw sewage being discharged into the effluent discharge line. The sewage treatment system of the invention further eliminates any problems which result when the operating mechanism is shut off, and the liquid sewage in the tanks seeks a corresponding water level within the air supply passages and tends to clog the passages.

In accordance with the illustrated embodiment of the invention, the raw sewage is received within a relatively large flat oval primary tank defining an enclosed shallow chamber wherein the liquid sewage is circulated in response to a circulating flow of air directed along the top surface of the liquid sewage. The air flow is produced by connecting a discharge air duct extending from the tank, to a chimney which projects upwardly above the ground level by a substantial distance, preferably adjacent or within the outer wall of the residence or house, affording a naturally induced draft.

The undigestable solid particles, usually between 5% and 10% of the solids, settle within the primary tank, and the remaining partially treated liquid sewage is directed to a second aerobic tank of similar construction and configuration. The second tank is connected to the first tank by an air duct so that a natural air flow is also created within the second tank by the chimney effect and produces circulation of the partially treated liquid within the second tank until all of the solid particles within the liquid are completely digested by surface diffusion of the air. The liquid then passes into a clarifier chamber, and a clear effluent is discharged from the second tank. The clear effluent may be directed through a simplified chlorinator which consists of a vertical housing in which chlorine crystals are urged downwardly by a combined valve and weight member slidably disposed within the tube.

BRIEF DESCRIPTION OF THE DRAWINGS

FIG. 1 is a perspective view of a sewage treatment system constructed in accordance with the invention and illustrating its underground installation adjacent a single family dwelling unit or small apartment building;

FIG. 2 is a plan view of the sewage treatment tanks shown in FIG. 1;

FIG. 3 is a fragmentary section of the bottom wall of each tank, for example, as taken along a line 3—3 of FIG. 2;

FIG. 4 is a fragmentary section taken generally on the line 4—4 of FIG. 2;

FIG. 5 is a fragmentary section taken generally on the line 5—5 of FIG. 2;

FIG. 6 is another fragmentary section taken generally on the line 6—6 of FIG. 2;

FIG. 7 is a further vertical section taken generally on the line 7—7 of FIG. 2; and FIG. 8 is a vertical section taken generally on the line 8—8 of FIG. 2.

DESCRIPTION OF THE PREFERRED EMBODIMENT

Referring to FIG. 1, a sewage treatment system constructed in accordance with the invention is illustrated and described in conjunction with the liquid sewage which is generated within an individual dwelling unit or residence 15 and which is discharged from the residence through an underground line 16. However, it is to be understood that the sewage treatment system of the invention may be designed for treating the sewage discharged from other types of buildings such as small apartments and small office, commercial or industrial buildings.

The liquid sewage directed through the line 16 is received within the chamber 18 (FIG. 5) of a flat oval-shaped primary settlement and aeration tank 20 which preferably is constructed of cast reinforced concrete. The ends of the tank 20 are semicylindrical, and the line 16 enters the tank generally tangentially at one end so that the inflow of the sewage causes circulation of the sewage within the chamber 18. The primary treatment tank 20 includes an oval-shaped lower portion formed by a bottom wall 22 and an integral sidewall 23. The tank 20 also includes an upper portion formed by a flat oval top wall 24 and a depending skirt 26 which seats on the sidewall 23 and is sealed by a suitable gasket material. While not illustrated, either or both of the walls 22 and 24 may be provided with laterally extending and outwardly projecting ribs to provide additional reinforcement of the cast concrete tank.

The liquid sewage within the chamber 18 is maintained at a level indicated by the dotted line 27, as a result of the position of a series of holes 28 within the upper open end portion of an overflow pipe 29 (FIG. 7) which will be explained later. As illustrated, the tank 20 has a length of approximately fourteen feet and width of approximately seven feet, and the chamber 18 has a depth of approximately twenty-six inches. This relatively large flat configuration of the tank 20 provides for a substantially large exposed surface area of the liquid sewage per unit volume or gallon.

Referring to FIGS. 2 and 5, a generally spiral baffle 30 depends from the upper wall 24 of the tank 20 and projects downwardly below the surface level 27 of the liquid sewage within the tank to define a generally spiral air chamber within the tank 20 above the surface level 27 of the liquid sewage. A straight portion 31 (FIG. 2) of the baffle 30 has a lower edge located slightly above the surface level 27 so that any matter floating on top of the circulating liquid can pass under the portion 31 and remain adjacent the outer side wall 23 and in the outer spiral channel of the tank. In addition, a baffle portion 31a (FIG. 2) has an upper edge located slightly above the level 27, so that matter floating on top of the circulating liquid is restrained from following the spiral path of the air and must remain in the outer spiral channel. While the spiral baffle 30 is illustrated in the form of a molded fiberglass rib which is embedded into the concrete upper wall 24, the baffle 30 may also be constructed of other materials or be formed of concrete as an integral part of the upper wall 24.

A rectangular air inlet opening 32 (FIG. 5) is formed within the upper wall 24 of the tank 20 above the sewage inlet line 16, and a similarly shaped air outlet opening 34 (FIG. 7) is formed within the upper tank wall 24 adjacent the overflow or outlet pipe 28. The air outlet opening 34 is connected by a duct 35 (FIG. 1) to the base portion of a chimney 40 which projects upwardly substantially above the ground surface. As shown, the chimney 40 consists of a rectangular duct which extends upwardly adjacent the outer end wall of the building structure 15 and projects through an opening within the roof in a manner similar to a conventional fireplace chimney.

The chimney 40 may be constructed in other various forms, for example, as one or more ducts within the outer wall of the building or may be formed by a U-shaped vertical cover which mounts on an existing fireplace chimney and defines a vertical air chamber outboard of the fireplace chimney. The duct or chimney may also be constructed of various materials such as sections of cast concrete or molded fiberglass or sections of an extruded plastics material. Preferably, a rectangular baffle member 41 is mounted on the upper end portion of the chimney 40 and has a downwardly and outwardly sloping surface to deflect a horizontal flow of air upwardly and thereby increase the updraft within the chimney by venturi action.

A plurality of circular inspection openings are formed within the cover or upper wall 24 of the tank 20 and are closed by corresponding covers 42. These openings provide for periodically checking the aerobic action within the primary tank 20 and for occasionally pumping out the small percentage of undigestible solids which collect in the bottom of the chamber 18.

A secondary aeration and clarifier tank 50 is positioned in parallel relation to the primary aeration tank 20 and is of similar concrete construction with a length of approximately fourteen feet, a width of approximately seven feet and a depth of approximately eight inches which is substantially less than the depth of the tank 20. The secondary tank 50 includes a bottom portion formed by a flat oval bottom wall 52 (FIG. 6) surrounded by a side wall 53 which extends upwardly and outwardly at an angle of approximately 60° relative to the horizontal bottom wall 52. A cover member or top wall 54 seats on the upper surface of the side wall 53 and cooperates with the lower or base portion to define a secondary treating chamber 56.

An annular intermediate wall 58 is positioned within the tank 50 and slopes downwardly and outwardly in converging relation with the downwardly and inwardly sloping side wall 53 to define an annular clarifying chamber 62 surrounding the treating chamber 56. The intermediate wall 58 is supported by a plurality of peripherally spaced and outwardly projecting integral ribs 63 which seat on the sloping outer or side wall 53 of the tank 50. A generally spiral baffle 64 depends downwardly from the upper wall 54 of the tank 50 in the same manner as the spiral baffle 30 within the tank 20 and projects below the surface level 66 of the liquid within the tank 50. As shown in FIG. 2, the outermost baffle 64 includes a straight portion 68 which extends into the intermediate wall 58 adjacent an air discharge opening 71 formed within the upper wall 54 of the tank 50.

An air duct 74 (FIGS. 1 and 2) connects the air discharge opening 71 within the upper wall 54 of the tank 50 to the air inlet opening 32 within the upper wall 24 of the tank 20. As will be explained later, the duct 74 provides for the flow of air from the secondary tank 50 to the primary tank 20 so that aerobic digestion is provided in both of the tanks. An air inlet duct 76 (FIG. 2) extends from the upper wall 54 of the tank 50 at substantially the geometric center of one end portion of the tank and is located directly over the innermost portion of the spiral baffle 64.

The liquid sewage treated in the primary tank 20 is directed by the line 29 (FIGS. 2 and 7) from the center of one end portion of the tank 20 to the center of the corresponding end portion of the tank 50. A cylindrical baffle 78 (FIG. 7) having vent holes 79, surrounds the upper inlet end of the pipe 29 within the tank 20 and assures that any scum floating on the surface of the liquid sewage within the tank 20 does not enter the pipe 29. The opposite end of the pipe 29 projects upwardly through the bottom wall 52 of the tank 50 and includes an elbow 81 (FIG. 2) which extends horizontally parallel to the inner run of the baffle 64.

Referring to FIG. 3, a series of generally radially extending inverted V-shaped ribs 84 are formed as an integral part of the bottom wall 52 of the tank 50 and are located at spaced intervals around the tank to create slight turbulence within the liquid sewage being treated in the tank 50 as the liquid circulates within the tank. As shown in FIG. 6, the liquid sewage treated within the chamber 56 of the tank 50 is directed by an L-shaped overflow pipe 85 from the chamber 56 through the intermediate wall 58 and to the clarifier chamber 62. A cylindrical baffle 87 having air vent holes 88, surrounds the upper inlet end of the pipe 85 to function in the same manner as the cylindrical baffle 78.

At the opposite end of the secondary tank 50, the completely digested liquid sewage or clear effluent is discharged from the clarifier chamber 62 by a discharge line 90 having an upper inlet end which is level with the bottom of the holes 28 in the upper end portion of the pipe 29 so that the liquid level 66 within the tank 50 is maintained at the same elevation as the liquid level 27 within the primary tank 20. A cylindrical baffle 92 having air vent holes 93, surrounds the upper inlet end of the discharge line 90 to assure that only clear effluent enters the discharge line 90.

Referring to FIGS. 1, 2 and 8, a chlorintaor unit 95 may be installed within the discharge line 90 and includes an upright vertical container or housing 96. The lower end portion of the housing 96 intersects the discharge line 90, and a pair of parallel spaced screen members 98 are positioned flush with the inner surface of the housing 96. The housing 96 has a rectangular cross-sectional configuration and defines a chamber which receives a supply of chlorine crystals 100 which are substantially larger than the openings within the screen members 98. A combined weight and valve member 102 is positioned for vertical sliding movement within the housing 96 and is effective to urge the chlorine crystals 100 downwardly between the screen members 98 and within the flow path of the effluent discharged through the line 90. When a supply of chlorine crystals are completely consumed, the valve member 102 seats on the bottom of the housing 96 and effectively stops the flow of liquid or effluent through the line 90.

In operation, the raw sewage discharged from the building 15 through the line 16, enters one end of the tank 20 in a tangential direction above the liquid level 26, as indicated in FIG. 5. This inflow of the liquid sewage produces circulation of the sewage within the chamber 18 in a counterclockwise direction as indicated by the arrows in FIG. 2. This initial circulation of the liquid sewage is continued as a result of the ntaural flow of air circulating within the spiral air chamber defined between the baffles 30 and above the surface 27 and from the air inlet 32 to the air outlet 34 connected to the chimney 40.

The cross-sectional area defined between adjacent baffles 30 and between the underneath surface of the upper tank wall 24 and the surface of the liquid sewage, is significantly smaller than the cross-sectional area of the air passage within the chimney 40 so that the velocity of the air between the adjacent baffles 30 is significantly greater than the upward flow of air within the chimney 40. This flow of air between the baffles 30 spirals inwardly within the tank 20 and produces circulation or turbulence of the liquid sewage within the chamber 18. As a result of the substantial area of liquid sewage exposed to the circulating air within the tank 20, the air diffuses into the sewage to effect preliminary aerobic digestion of the sewage. The approximately 5% to 10% of the nondigestible trash and solid particles within the sewage settle to the bottom of the tank 20.

The partially digested liquid sewage within the primary tank 20 flows through the line 29 to the secondary tank 50 where the remaining portion of any small organic solid particles are completely digested by the exposure of the particles to the air flow circulating within the tank 50 between the spiral baffles 64. The upper end portion of the line 29 projecting above the normal liquid level 27 is effective to hold temporary surges of liquid sewage received within the tank 20 from the residence 15. The simultaneous circulation of the liquid and air within the tank 50 and the substantial exposure of the liquid to the air cause the air to diffuse into the liquid so that the remaining fine solid particles are aerobically digested and the liquid becomes a satisfactory bio-chemically stable effluent.

As mentioned above, a slight turbulence of the circulating liquid within the tank 50 is created by the series of laterally extending ribs 84 within the bottom wall of the tank. This turbulence assures that the fine solids particles are deflected upwardly within the liquid as the entire body of liquid circulates or orbits clockwise within the tank 50 as indicated by the arrows shown in FIG. 2. As also mentioned above, the air duct 74 is effective to conduct the air flow within the secondary tank 50 to the primary tank 20 so that the chimney 40 draws air through both tanks. However, it is apparent that the outlet air duct 35 which extends from the base of the chimney 40 may also be connected directly to the air outlet within the secondary tank 50 so that the air circulating within one tank is independent of the air circulating within the other tank.

After the liquid is completely treated within the secondary tank 50 and all of the solids are aerobically digested, the liquid flows through the pipe 85 to the clarifier chamber 62 which provides for final settlement of any particles and assures that only a clear effluent is discharged from the tank 50 through the line 90.

From the drawings and the above description, it is apparent that a seawage treatment system constructed in accordance with the present invention provides desirable features and advantages. For example, it is apparent that the aerobic digestion system illustrated in the drawings, has not moving parts and requires no electrical power supply. Thus the system eliminates all of the problems associated with maintaining the operation of the moving parts along with the problems resulting when the parts fail to operate. By providing each of the tanks 20 and 50 with an area in horizontal cross-section substantially greater than its area in vertical cross-section, and perferably at least five times greater, a large area of the liquid sewage is exposed to the moving air so that there is substantial surface diffusion of the air into the sewage. This surface diffusion has been found to provide for effective digestion of all of the solid particles within a matter of hours.

As another advantage, the draft created by the chimney 40 provides for a natural flow of air through the tanks 20 and 50 so that aerobic digestion results in both the tanks 20 and 50. That is, the air flow or draft of air up the chimney 40 as a result of the slight differential pressure between the difference in elevation of the air inlet duct 76 and the upper end of the chimney 38 and the venturi action created by air flowing over the upper end of the chimney 40, results in a natural flow of air through the tanks 20 and 50. This flow of air through the tanks 20 and 50 between the corresponding baffles 30 and 64 results in a corresponding circulation of the liquid within the tanks, due to the friction effects between the flowing air and the upper surface of the liquid. The baffle member 41 mounted on the upper end of the chimney 40 is also effective to increase the venturi effect and the corresponding draw of the chimney.

Another important advantage is provided by the simplified construction and operation of the chlorinator unit 95. That is, the flow of the discharge effluent through the chlorine crystals 100 is effective to chlorinate the effluent at the desired rate. However, if the homeowner forgets to add a new supply of chlorine crystals 100, the valve member 102 will close the discharge line 90. This assures that no effluent is discharged from the system unless the effluent is chlorine treated. It is to be understood that the chlorinator unit 95 is optional equipment and is not necessary for aerobic digestion of liquid sewage in accordance with the present invention.

While the method and form of apparatus herein described constitute a preferred embodiment of the invention, it is to be understood that the invention is not limited to the precise method and form of apparatus described, and that changes may be made therein without departing from the scope and spirit of the invention. For example, in some installations where a substantial flow of air is created by the natural draft of chimney, only one aeration tank constructed in accordance with the invention may be required or the primary tank may be substantially smaller in horizontal dimensions than the secondary tank.

It is also apparent that the chimney 40 may be constructed as a free standing unit rather than being supported by the outer wall of a building and be only a few feet high where there are significant air currents adjacent the ground. It is also possible to replace the draft created by the chimney 40 with a continuously operating motor driven fan which would be located in either the air inlet or air outlet duct. However, such a fan would involve a moving part and an electrical power supply which is eliminated by use of the chimney 40. It is further apparent that either of the tanks 20 or 50 may be constructed in a different configuration, such as circular, rectangular or in sections. However, the configuration illustrated is ideally suited for transporting the tanks along the roadway. It is also possible for the spiral baffles 30 or 64 to be eliminated when a correspondingly reduced flow of air within the tanks is effective to assure adequate surface diffusion and complete aerobic digestion of the organic solid materials within the liquid sewage.

The invention having thus been described, the following is claimed:

1. Apparatus for aerobically digesting organic matter within sewage water, comprising a tank including bottom, top and side walls defining a generally circular enclosed treating chamber having an area in horizontal cross-section substantially greater than its area in vertical cross-section to expose a large surface area of the sewage water, means for directing sewage water into said chamber in a direction to effect horizontal circulation of the sewage water in a generally circular horizontal path within said chamber, conduit means defining an outlet within the center portion of said chamber for limiting the sewage water within said chamber at a level below said top wall of said tank to define an air space within said chamber above the surface of the water, conduit means for supplying a flow of air into said air space, and means adjacent said top wall of said tank for directing the flow of air in said generally circular horizontal path over the surface of the sewage water to continue the horizontal circulation of the sewage water in said path when the flow of sewage water into said chamber has stopped and to effect diffusing of air into the water.

2. Apparatus as defined in claim 1 wherein said means for directing the flow of air in said generally circular horizontal path over the surface of the sewage water comprise curved baffle means positioned within said air space to assure that the air contacts the entire surface area of the sewage water.

3. Apparatus as defined in claim 2 wherein said baffle means comprises a generally spiral baffle member depending from said top wall of said tank into said chamber to substantially the level of the liquid sewage within said chamber.

4. Apparatus as defined in claim 1 and including a second tank including bottom, top and side walls defining a second generally circular enclosed treating chamber, means for directing the treated water from the first said tank into said second chamber in a direction to effect horizontal circulation of the water in a generally circular horizontal path within said second chamber, means defining an outlet for said second chamber and for limiting the water at a level below said top wall of said second tank to define a second air space, and means for directing a flow of air in said generally circular horizontal path within said second air space for continuing the horizontal circulation of the water in said second tank.

5. Apparatus as defined in claim 4 wherein the first said tank has a vertical depth greater than the vertical depth of said second tank.

6. Apparatus as defined in claim 1 including a chlorinator unit having a housing defining an inlet connected to said conduit means defining said outlet for receiving the treated water from said tank, said housing defining a chamber for receiving a supply of solid chlorine crystals, and a weight member positioned to urge the crystals downwardly within said housing chamber and being effective to close said inlet when the crystals are completely dissolved.

7. Apparatus as defined in claim 1 wherein the area of said treating chamber in horizontal cross-section is at least five times greater than the area of said treating chamber in vertical cross-section.

8. Apparatus as defined in claim 1 including means defining an opening within the center portion of said top wall generally above said outlet for discharging the flow of air from said air space.

9. A method of aerobically digesting the organic matter within sewage water, comprising the steps of introducing the sewage water into a generally circular chamber of an enclosed tank having an area in horizontal cross-section substantially greater than its area in vertical cross-section to expose a large surface area of the sewage water, directing the sewage water in a direction to effect horizontal circulation of the sewage water in a generally circular horizontal path within the chamber, introducing a flow of air into an air space between the surface of the sewage water and the top wall of the tank, directing the flow of air in said generally circular horizontal path over the surface of the sewage water to continue the horizontal circulation of the sewage water within the chamber and to diffuse air into the sewage water, and discharging the treated water from the center portion of said chamber through an outlet located adjacent the surface of the water.

10. A method as defined in claim 9 wherein the flow of air in said generally circular horizontal path within said air space is produced by a natural air current through said chamber.

11. A method as defined in claim 9 wherein the flow of air within said air space is directed in a generally spiral path over the surface of the sewage water.

12. A method as defined in claim 9 including the step of directing the treated water within said tank chamber into a second enclosed tank chamber having an area in horizontal cross-section substantially greater than its area in vertical cross-section, and directing a flow of air in a generally circular horizontal path over the surface of the water within said second chamber to effect continued circulation of the water and further aerobic digestion of the organic material within the sewage.

13. A method as defined in claim 9 wherein the sewage water is directed generally horizontally and tangentially into a curved portion of said tank to effect said circulation of the water within said chamber.

14. A method as defined in claim 9 including the step of discharging the air flow from the center portion of said tank generally above said outlet.

References Cited

UNITED STATES PATENTS

| | | | |
|---|---|---|---|
| 3,732,160 | 5/1973 | Klock | 210—14 |
| 1,349,608 | 8/1920 | Donaldson | 55—237 |
| 2,432,887 | 12/1947 | Haviland | 210—532 S |
| 2,068,140 | 1/1937 | Jaquith | 210—532 S |
| 3,462,360 | 8/1969 | McKinney | 210—15 X |
| 2,483,564 | 10/1949 | Sitton | 210—532 S |
| 3,487,937 | 1/1970 | Koulovatos | 210—195 |
| 2,553,977 | 5/1951 | Mau | 137—268 X |

FOREIGN PATENTS

| | | | |
|---|---|---|---|
| 503,336 | 6/1927 | Germany | 210—532 |
| 878,240 | 10/1942 | France | 210—170 |

JOHN ADEE, Primary Examiner

R. H. SPITZER, Assistant Examiner

U.S. Cl. X.R.

210—15, 170, 199, 201, 220, 532 S